United States Patent
Wu et al.

(10) Patent No.: US 11,113,849 B2
(45) Date of Patent: Sep. 7, 2021

(54) METHOD OF CONTROLLING VIRTUAL CONTENT, TERMINAL DEVICE AND COMPUTER READABLE MEDIUM

(71) Applicant: GUANGDONG VIRTUAL REALITY TECHNOLOGY CO., LTD., Guangzhou (CN)

(72) Inventors: Yiqun Wu, Guangzhou (CN); Yongtao Hu, Guangzhou (CN); Jingwen Dai, Guangzhou (CN); Jie He, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 16/720,015

(22) Filed: Dec. 19, 2019

(65) Prior Publication Data
US 2020/0126267 A1 Apr. 23, 2020

Related U.S. Application Data

(63) Continuation of application No. PCT/CN2019/100101, filed on Aug. 10, 2019.

(30) Foreign Application Priority Data

Aug. 10, 2018 (CN) .......... 201810911024.0
Aug. 17, 2018 (CN) .......... 201810942716.1

(51) Int. Cl.
*G06T 11/00* (2006.01)
*G06T 7/70* (2017.01)
*G06K 9/00* (2006.01)

(52) U.S. Cl.
CPC .......... *G06T 11/00* (2013.01); *G06K 9/00664* (2013.01); *G06T 7/70* (2017.01); *G06T 2207/30204* (2013.01)

(58) Field of Classification Search
CPC combination set(s) only.
See application file for complete search history.

(56) References Cited

U.S. PATENT DOCUMENTS 9,552,674 B1 * 1/2017 Jayadevaprakash .... G06F 3/011
10,281,987 B1 * 5/2019 Yang .................... G06F 3/04847
(Continued)

FOREIGN PATENT DOCUMENTS

| CN | 106125932 A | 11/2016 |
|---|---|---|
| CN | 104880263 X | 3/2017 |
| CN | 107402735 A | 11/2017 |

OTHER PUBLICATIONS

International Search Report (PCT/CN2019/100101); dated Oct. 30, 2019.

*Primary Examiner* — Andrew G Yang

(57) ABSTRACT

A method of controlling virtual content, a terminal device and a computer readable medium are provided. The terminal device includes a display configured to display a virtual object, a camera configured to capture a target image including a marker, at least one processor, and a memory. The memory stores one or more programs configured to be executed by the at least one processor. The one or more programs includes instructions of acquiring the target image including the marker, where a plurality of sub-markers is distributed on the marker; determining a blocked target, wherein the blocked target is a blocked sub-marker of the plurality of sub-markers in the target image; generating a control instruction according to the blocked target; and controlling the displayed virtual object based on the control instruction.

20 Claims, 7 Drawing Sheets

(56) References Cited

U.S. PATENT DOCUMENTS

| | | | |
|---|---|---|---|
| 2005/0234333 A1* | 10/2005 | Takemoto | G06T 7/80 600/426 |
| 2010/0146389 A1* | 6/2010 | Yoo | G06F 3/04815 715/702 |
| 2011/0187743 A1* | 8/2011 | Hwang | G06K 9/00671 345/633 |
| 2013/0038633 A1* | 2/2013 | Maggiore | B01J 19/0033 345/633 |
| 2015/0185829 A1* | 7/2015 | Yang | G06F 3/017 345/633 |
| 2015/0228122 A1* | 8/2015 | Sadasue | G06F 3/002 345/633 |
| 2015/0302649 A1 | 10/2015 | Komatsu | |
| 2015/0317518 A1* | 11/2015 | Fujimaki | G02B 27/017 345/633 |
| 2016/0189428 A1* | 6/2016 | Matsubayashi | G06T 19/006 345/633 |
| 2016/0196692 A1* | 7/2016 | Kjallstrom | G06F 3/04815 345/633 |
| 2016/0217614 A1* | 7/2016 | Kraver | G02B 27/017 |
| 2017/0344124 A1* | 11/2017 | Douxchamps | G06F 3/04886 |
| 2018/0322701 A1* | 11/2018 | Pahud | G06F 3/017 |
| 2019/0034765 A1* | 1/2019 | Kaehler | G02B 27/0172 |
| 2019/0212828 A1* | 7/2019 | Kin | G06F 3/04815 |

\* cited by examiner

US 11,113,849 B2

METHOD OF CONTROLLING VIRTUAL CONTENT, TERMINAL DEVICE AND COMPUTER READABLE MEDIUM

CROSS-REFERENCE TO RELATED APPLICATIONS

The present application is a continuation-application of International Patent Application No. PCT/CN2019/100101 filed on Aug. 10, 2019, which claims priority to Chinese Patent Application No. 201810911024.0, filed on Aug. 10, 2018, and Chinese Patent Application No. 201810942716.1 filed on Aug. 17, 2018, the content of which are incorporated herein by reference in their entireties.

TECHNICAL FIELD

The present disclosure relates to the field of interaction technology, and more particularly, to a method of controlling virtual content.

BACKGROUND

In recent years, with the advancement of science and technology, technologies such as Augmented Reality (AR) have gradually become the search hotspot all over the world. Augmented Reality is a technique that increases user's perception of the real world through information provided by a computer system, and it superimposes content objects such as computer-generated virtual objects, scenes, or system prompts into real scenes, to enhance or modify the perception of real-world environments or data representing the real-world environments. There is still room for improvement in the interaction technology between the user and virtual content in the field of Augmented Reality.

SUMMARY

The present disclosure provides a method of controlling virtual content.

In a first aspect, an embodiment of the present disclosure provides a method of controlling virtual content, the method includes: acquiring a target image, where the target image has a marker and a plurality of sub-markers is distributed on the marker; determining a blocked sub-marker of the plurality of sub-markers in the target image as a blocked target; and generating, according to the blocked target, a control instruction for controlling a display of a virtual object.

In a second aspect, an embodiment of the present disclosure provides a marker recognition method including: acquiring a target parameter when recognizing a marker, the target parameter being configured to adjust an imaging parameter of the marker; adjusting the imaging parameter according to the target parameter; acquiring, according to the imaging parameter after adjusting, an image including the marker; and recognizing the marker according to the image including the marker.

In a third aspect, an embodiment of the present disclosure provides a terminal device. The terminal device includes a display configured to display a virtual object, a camera configured to capture a target image including a marker, at least one processor, and a memory. The memory stores one or more programs configured to be executed by the at least one processor. The one or more programs includes instructions of: acquiring the target image including the marker, wherein a plurality of sub-markers is distributed on the marker; determining a blocked target, wherein the blocked target is a blocked sub-marker of the plurality of sub-markers in the target image; generating a control instruction according to the blocked target; and controlling the displayed virtual object based on the control instruction.

In a fourth aspect, an embodiment of the present disclosure further provides a computer readable medium. The computer readable storage medium stores a program code. The program code is executable by a processor to cause the process to execute the method in the above embodiments.

Details of one or more embodiments of the present disclosure are set forth in the accompanying drawings and description below. Other features, objects, and advantages of the present disclosure will be apparent in the description, drawings and claims.

BRIEF DESCRIPTION OF DRAWINGS

In order to more clearly illustrate the technical solutions in the embodiments of the present disclosure, the drawings used in the description of the embodiments will be briefly described below. The drawings in the following description are only some embodiments of the present application. For those skilled in the art, other drawings can also be obtained based on these drawings without paying any creative effort.

DESCRIPTION OF EMBODIMENTS

The technical solutions in the embodiments of the present disclosure will be clearly and completely described in the following with reference to the accompanying drawings in embodiments of the present disclosure.

Figure 1A:
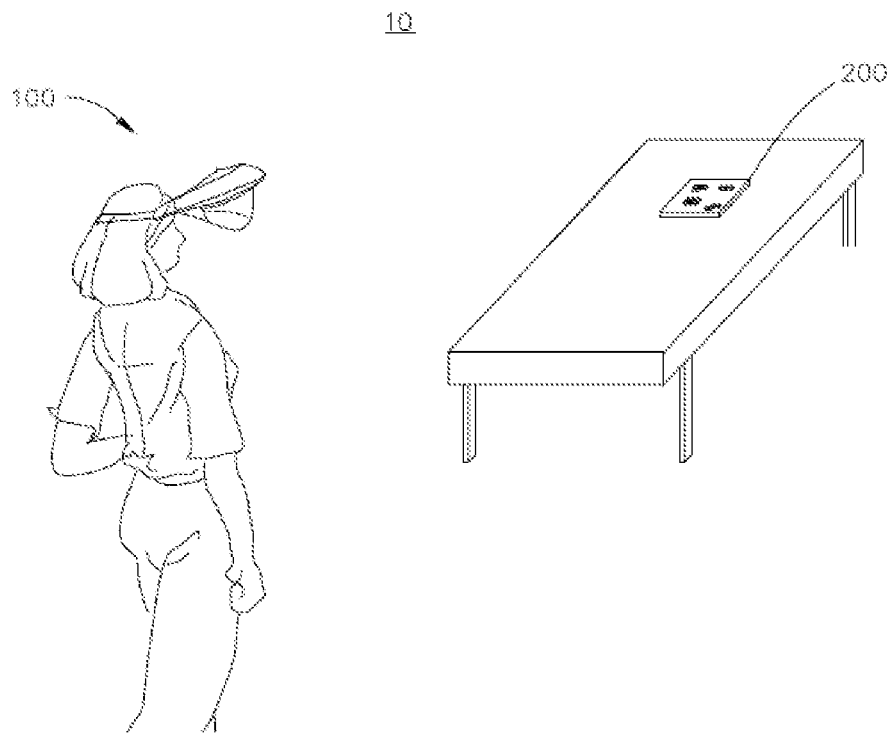
FIGS. 1a-1c are schematic diagrams showing an interaction system provided by embodiments of the present disclosure.
Figure 1B:
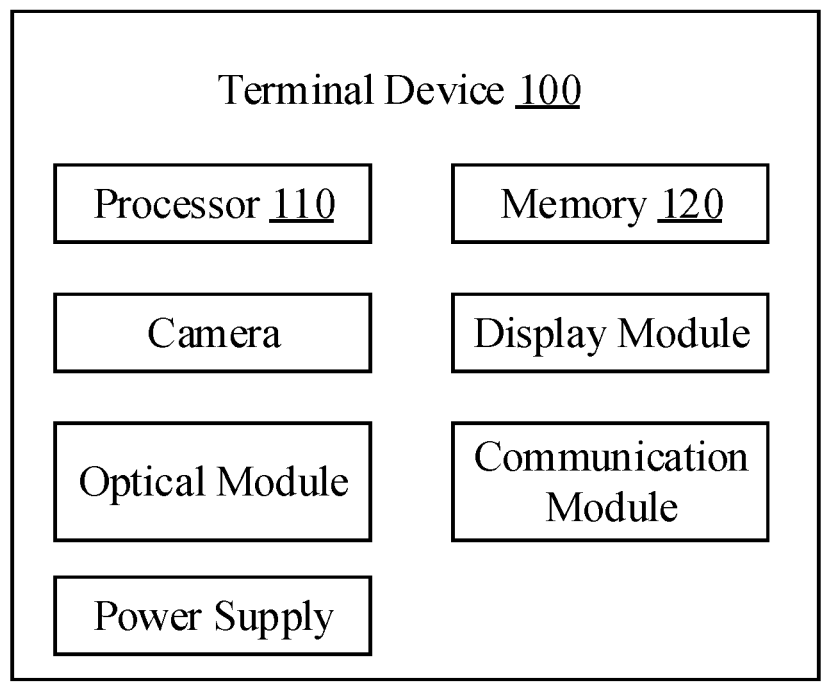
Figure 1C:
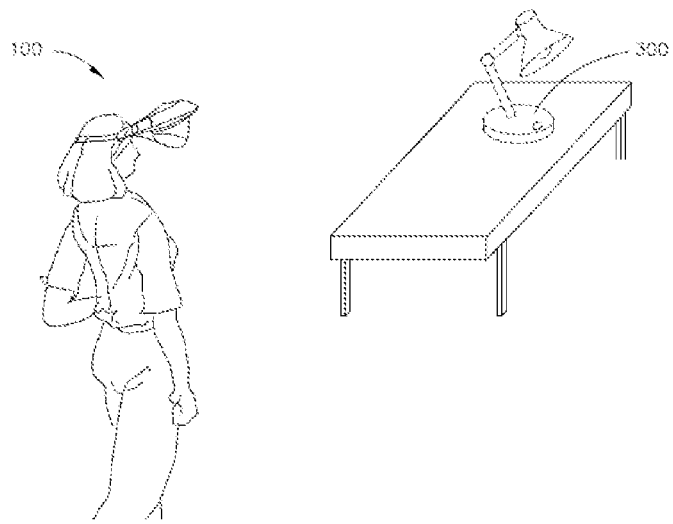

Referring to FIGS. 1a-1c, an interaction system 10 provided by embodiments of the present disclosure includes a terminal device 100 and a marker 200. The terminal device 100 can be a head mounted display or a mobile device such as a mobile phone or a tablet. If the terminal device 100 is a head mounted display, the head mounted display can be an integrated head mounted display and can also be a head mounted display connected to an external electronic device. The terminal device 100 can also be a smart terminal such as a mobile phone connected to an external/plug-in head mounted display. That is, the terminal device 100, as a processing and storage device for the head mounted display, is plugged in or connected to the head mounted display exteriorly to display a virtual object in the head mounted display.

In some embodiments, the terminal device 100 can include a processor 110 and a memory 120. One or more computer programs are stored in the memory 120 and can be configured to be executed by the processor 110, to implement the method described in the embodiments of the present disclosure.

The processor 110 includes one or more processing cores. The processor 110 connects each part of the entire terminal device 100 through various interfaces and lines. By running or executing instructions, programs, code sets, or instruction set stored in the memory 120, and invoking data stored in the memory 120, various functions of the terminal device 100 are executed and data are processed. The processor 110 can be implemented with at least one hardware form selected from Digital Signal Processor (DSP), Field-Programmable Gate Array (FPGA), or Programmable Logic Array (PLA). The processor 110 can integrate one or a combination of a Central Processing Unit (CPU), a Graphics Processing Unit (GPU), a modem, and the like. The CPU mainly processes an operating system, a user interface, an application, and the like. The GPU is responsible for rendering and drawing a content that is displaying. The modem is configured to process wireless communications. The modem above can also not be integrated into the processor 110 and can be implemented by a single communication chip individually.

The memory 120 includes a Random Access Memory (RAM) and a Read-Only Memory. The memory 120 can be configured to store instructions, programs, codes, code sets, or instruction set. The memory 120 can include a program storage region and a data storage region. The program storage region can store an instruction for implementing an operating system, an instruction for implementing at least one function (such as a touch function, a sound playing function, an image playing function, etc.), instructions for implementing various method embodiments below, and the like. The data storage region can also store data created by the terminal device 100 in use, and the like.

In some embodiments, the terminal device 100 further includes a camera that is configured to capture an image of a real object and capture a scene image of a target scene. The camera can be an infrared camera or a visible light camera, and the specific type is not limited.

In an embodiment, the terminal device 100 is a head mounted display. The terminal device 100 further includes one or more of following components: a display module, an optical module, a communication module, and a power supply. The display module can include a display control unit, and the display control unit is configured to receive an image of virtual content after the image has been rendered by the processor, display the image and project the image onto the optical module to enable a user to view the virtual content through the optical module. The display module can be a display screen or a projection device or the like, and is configured to display an image. The optical module can adopt an off-axis optical system or a waveguide optical system, and the image of the display module can be projected on eyes of the user after passing through the optical module. The user can view, through the optical module, the image projected by the display module. In some embodiments, the user can also observe a real environment through the optical module and get a visual effect obtained by superimposing of the virtual content and the real environment. The communication module can be a module such as Bluetooth, Wi-Fi (Wireless Fidelity), ZigBee (Zigbee Protocol), or the like, and the terminal device communicates with an interaction device through the communication module, for information and instruction interaction. The power supply can supply power to the entire terminal device to ensure a normal operation of each component of the terminal device.

In some embodiments, the marker 200 can be any pattern or object having an identifiable feature that is not specifically limited. For example, the marker 200 is a pattern having a topology structure, and the topology structure refers to a communication relationship between sub-markers, feature points and the like in the marker. In one embodiment, an infrared filter may be disposed outside the marker 200, and the pattern of the marker is invisible to the user. The camera is an infrared camera and the marker 200 is irradiated by infrared light to cause the camera to capture an image including the marker 200, which reduces an influence of the visible light in the environment on images of the marker and improves an accuracy of tracking.

When the marker 200 is located within a visual range of the camera of the terminal device 100, the camera can capture an image including the marker 200. The processor acquires the image including the marker, recognizes the marker, so as to obtain position and pose of the terminal device 100 relative to the marker 200. According to the position and pose of the terminal device 100 relative to the marker 200, a user may observe that a virtual object 300 is superimposed onto a real space through the terminal device 100.

Figure 2:
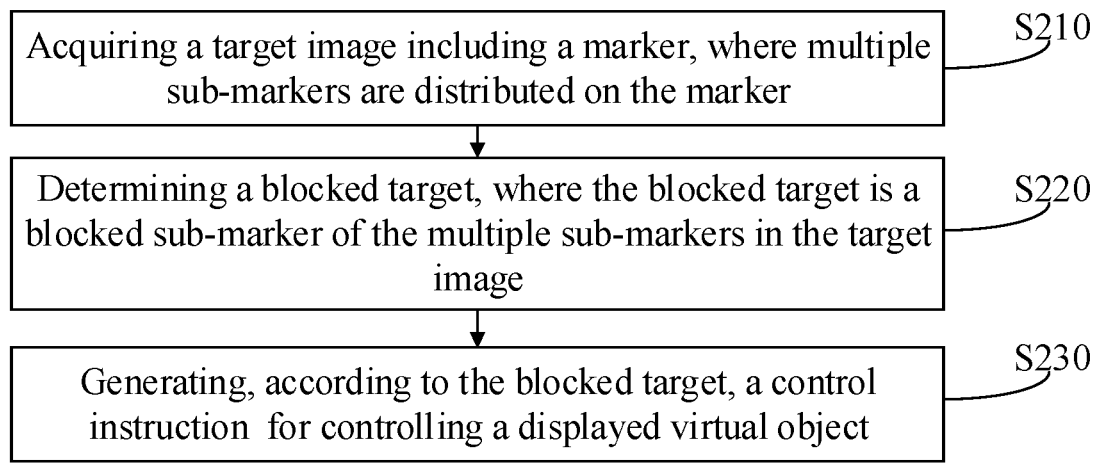
FIG. 2 is a flowchart of a method of controlling virtual content provided by an embodiment of the present disclosure.

Referring to FIG. 2, an embodiment of the present disclosure provides a method of controlling virtual content, the method is performed by a terminal device 100 and includes blocks S210 to S220.

Block S210: acquiring a target image including a marker, where multiple sub-markers are distributed on the marker.

The terminal device may capture an image including the marker through a camera. Among the multiple sub-markers distributed on the marker, features of multiple sub-marker is different. For example, the feature can include a shape, an outline, a size, or the number of feature points. The terminal device may extract the feature of each sub-marker in the captured image, and then determine an identification of each sub-marker in the image through a preset correspondence between the feature and the identification of the sub-marker.

The sub-markers contained in different markers are not completely identical, and the identification of a corresponding marker can be determined according to the sub-markers included in the captured image. The terminal device can generate and display a corresponding virtual object according to the identification of the marker.

The terminal device can recognize the markers in the captured image to acquire position and pose of the terminal device relative to the marker, render and display a corresponding virtual object, such that the user can observe, through the terminal device, that the virtual object is superimposed onto the real scene.

Block S220: determining a blocked target, where the blocked target is a blocked sub-marker of the multiple sub-markers in the target image.

The terminal device can acquire, in advance, an image including the marker, and store the image as a standard image. After the terminal device displays the virtual object, the user can control the virtual object by blocking the marker. The terminal device can compare the captured image with the standard image to determine a sub-marker that is not photographed in the captured image including the marker, that is, the blocked sub-marker, and takes the blocked sub-marker as the blocked target.

Figure 3A:
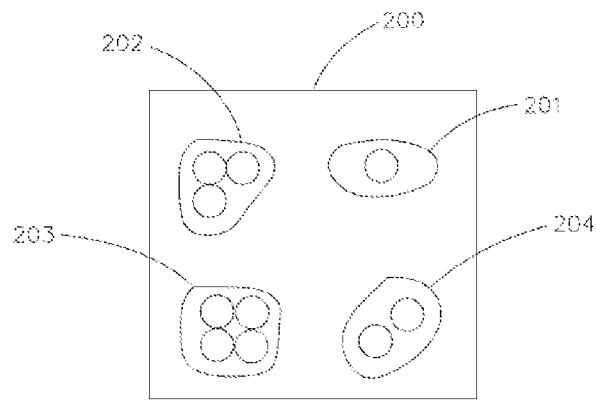
FIGS. 3a-3c are schematic diagrams showing sub-markers and corresponding scenes provided by some embodiments of the present disclosure.
Figure 3B:
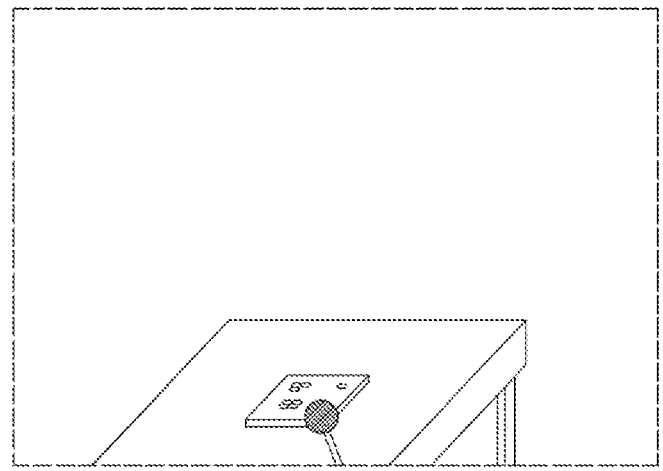

In one implementation, as shown in FIG. 3a, four sub-markers, i.e., a first sub-marker 201, a second sub-marker 202, a third sub-marker 203 and a fourth sub-marker 204, are distributed on the marker 200. Features of all sub-markers may be different. The feature can be information such as the number, color, shape, and the like of the feature points included in the sub-marker. For example, the first sub-marker 201 includes one feature point, and the feature point is a ring. As shown in FIG. 3b, a partial region of the marker is blocked, and the image captured by the terminal device only contains part of the sub-markers of the marker. By comparing the captured image with the pre-stored standard image, it can be determined that the fourth sub-marker 204 is blocked.

Block S230: generating, according to the blocked target, a control instruction for controlling a displayed virtual object.

The control instruction is configured to control the displayed virtual object. For example, the control instruction may control the virtual object to rotate, enlarge, reduce, perform a specific action effect, switch the displayed virtual object to a new virtual object, or add a new virtual object to a current augmented reality scene, which is not specifically limited.

In one embodiment, the correspondence between the blocked target and the control instruction is pre-stored in the terminal device, as shown in Table 1 below.

TABLE 1

| Virtual Object | |
| --- | --- |
| Blocked Target | Control Instruction |
| First Sub-marker | Enlargement |
| Second Sub-marker | Reduction |
| Third Sub-marker | Pose |
| Fourth Sub-marker | Designated Action |

According to the correspondence, a corresponding control instruction can be obtained by the determined blocked target. For example, if the blocked target is the fourth sub-marker, the corresponding control instruction is to control the virtual object to perform a designated action, and the designated action can be set in combination with a specific application scene and the virtual object. For example, the virtual object is a desk lamp shown in FIG. 1c, and the designated action for the fourth sub-marker is to switch an on/off state of the desk lamp. When the current desk lamp is off, the designated action is to turn on the desk lamp; and when the current desk lamp is on, the designated action is to turn off the desk lamp.

In some embodiments, the control instruction can also be determined according to blocked information of the blocked target. The blocked information of the blocked target may include a ratio of an area of a blocked portion of the blocked target to an area of an unblocked portion of the blocked target. The terminal device can compare the captured image with the standard image, determine the blocked portion and the unblocked portion of the blocked sub-marker, and determine a size of an area of the blocked portion according to the number of pixel points respectively occupied by the blocked portion and a size of an area of the unblocked portion according to the number of pixel points occupied by the unblocked portion in the image. Different blocked information may correspond to different control instructions. In one embodiment, the control instruction corresponding to the blocked information in the captured image can be acquired according to the correspondence between the blocked information and the control instruction, the correspondence being preset in the terminal device.

In one implementation, the terminal device acquires the corresponding control instruction according to the identification of the blocked target, and acquires a sub-control instruction according to the blocked information of the blocked target. The sub-control instruction can refine a control on the virtual object. For example, if the control instruction is to enlarge or reduce, the sub-control instruction is a multiples of the enlargement or reduction. Taking the desk lamp in FIG. 1c as an example, if the identification of the blocked target is the fourth sub-marker, the control instruction corresponding to the fourth sub-marker is to control the desk lamp to be turned on, and the sub-control instruction corresponding to the blocked information of the fourth sub-marker is to adjust brightness of the desk lamp.

In an exemplary embodiment, the terminal device displays the desk lamp in an off state according to the position and pose of the marker. When the terminal device detects, according to the captured image, that the fourth sub-marker of the marker is blocked, the displayed desk lamp can be turned on. The terminal device detects that a ratio of an area of the blocked portion to an area of the unblocked portion of the fourth sub-marker is 1:1, and obtain the control instruction configured to set brightness of the desk lamp to be 50% of a highest brightness value. The terminal device controls the desk lamp according to the control instruction, such that the user observes the light of the desk lamp with 50% brightness. The brightness value of the desk lamp can be relevant to the blocked information. For example, if the ratio of the area of the blocked portion of the blocked target to the area of the unblocked portion of the blocked target is different, a corresponding brightness value is also different.

Figure 3C:
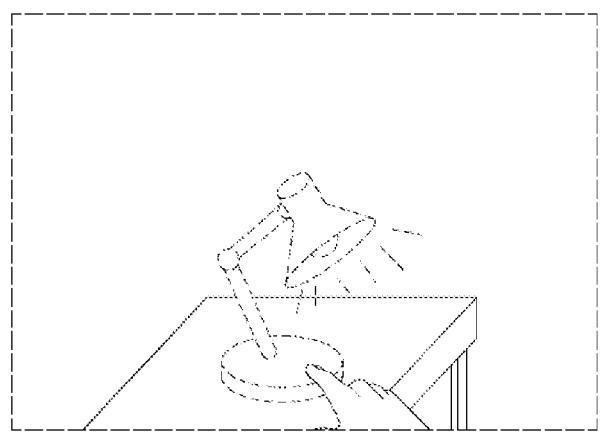

In some embodiments, a position of each sub-marker on the marker can correspond to a displayed virtual button. When the user blocks the sub-marker, a visual effect of pressing a corresponding virtual button is generated. For example, FIG. 3c shows an on-off key of the desk lamp. The on-off key corresponds to the fourth sub-marker of the marker. When the user blocks the fourth sub-marker, a control instruction configured to turn on the desk lamp is generated. In one implementation, the virtual button can be directly superimposed on a corresponding sub-marker, such that the user intuitively controls the virtual button by blocking the sub-marker.

Therefore, the user controls the displayed virtual object by blocking the sub-marker in the marker, which improves interactivity between the user and the virtual object.

Figure 4:
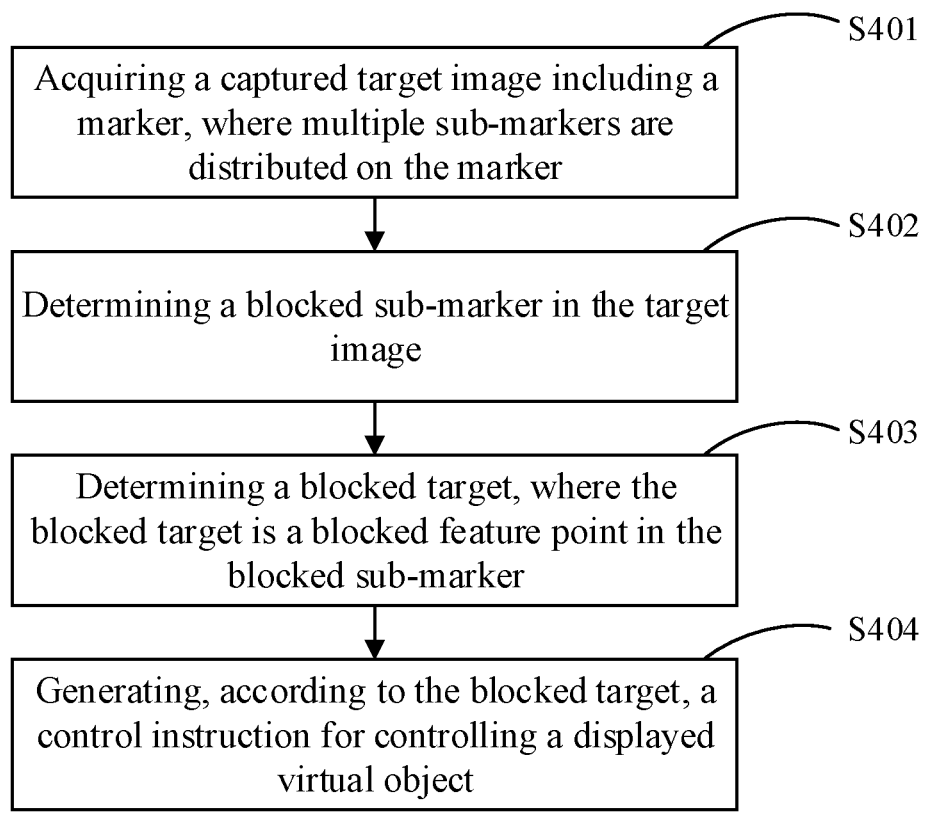
FIG. 4 is a flowchart of a method of controlling virtual content according to another embodiment of the present disclosure.

In some embodiments, each sub-marker includes at least one feature point. When different feature points are blocked, the terminal device can acquire corresponding control instructions to control the displayed virtual object. As shown in FIG. 4, a method of controlling virtual content in another embodiment of the present disclosure includes blocks S401 to S404.

Block S401: acquiring a captured target image including a marker, where multiple sub-markers are distributed on the marker.

Block S402: determining a blocked sub-marker in the target image.

Block S403: determining a blocked target, where the blocked target is a blocked feature point in the blocked sub-marker.

Figure 5:
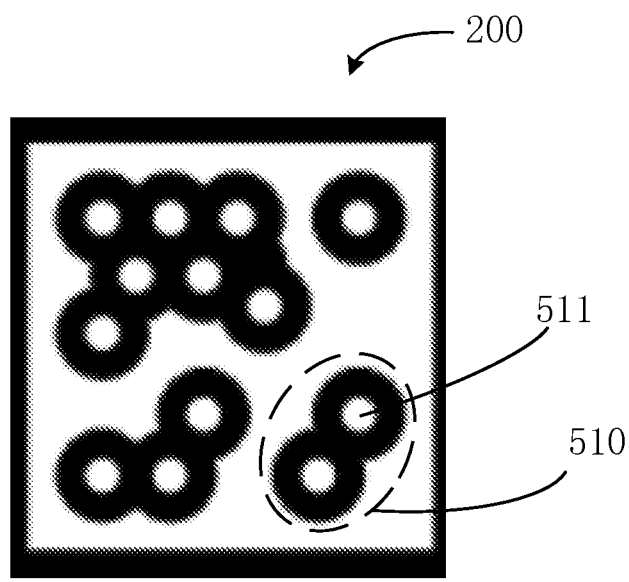
FIG. 5 is a schematic diagram of a marker provided by an embodiment of the present disclosure.

As shown in FIG. 5, the marker 200 includes multiple sub-markers 510. Each sub-marker 510 is composed of one or more feature points 511, and each white circular pattern is one feature point 511.

The standard image pre-stored includes all sub-markers on the marker, and all feature points included in each sub-marker. The terminal device can compare the captured image with the standard image to determine the blocked sub-marker and the blocked feature point. Different feature points can correspond to different identifications, and the identification of the blocked feature point can be acquired, for example, first sub-marker-feature point 1 indicates that a feature point currently blocked is the feature point 1 within the first sub-marker.

In some embodiments, one sub-marker included in the marker can also be formed by multiple solid black dots that are separated from each other.

Block S404: generating, according to the blocked target, a control instruction for controlling the virtual object.

A correspondence between the feature point and the control instruction is stored in the terminal device, and a control instruction corresponding to the blocked feature point can be determined according to the correspondence.

In one embodiment, a control instruction corresponding to the feature point and a control instruction corresponding to the sub-marker to which the feature point belongs can be a same type of control instructions. For example, in Table 2, a control instruction corresponding to the first sub-marker is to enlarge. A control instruction corresponding to the feature point 1 included in the first sub-marker is to enlarge by one time. A control instruction corresponding to a feature point 2 included in the first sub-marker is to enlarge by twice. When the user blocks the sub-marker to control the virtual object, a further control on the virtual object can be achieved by blocking different feature points included in the sub-marker.

TABLE 2

| Virtual Object 1 | |
|---|---|
| Blocked Target | Control Instruction |
| First Sub-marker | Enlargement |
| Feature Point 1 | Enlarge by one time |
| Feature Point 2 | Enlarge by twice |
| Feature Point 3 | Enlarge by three times |
| Second Sub-marker | Reduction |
| Feature Point 1 | Reduce by one time |
| Feature Point 2 | Reduce by twice |
| Third Sub-marker | Pose |
| Feature Point 1 | Rotate by 60° |
| Feature Point 2 | Rotate by 120° |
| Feature Point 3 | Rotate by 180° |

By blocking the feature point to control the virtual object, interaction modes between the user and the virtual object become more diverse and refined. In some embodiments, the control instruction corresponding to the feature point and the control instruction corresponding to the sub-marker to which the feature point belongs may be different types of control instructions. When it is detected that a feature point is blocked, a control instruction is generated according to both the blocked feature point and the sub-marker to which it belongs, to control the virtual object. For example, the control instruction corresponding to the sub-marker is to enlarge, and the control instruction corresponding to the feature point 1 of the sub-marker is to rotate by 60°. When it is detected that the feature point 1 of the sub-marker is blocked, the virtual object can be enlarged and rotated by 60°.

Figure 6:
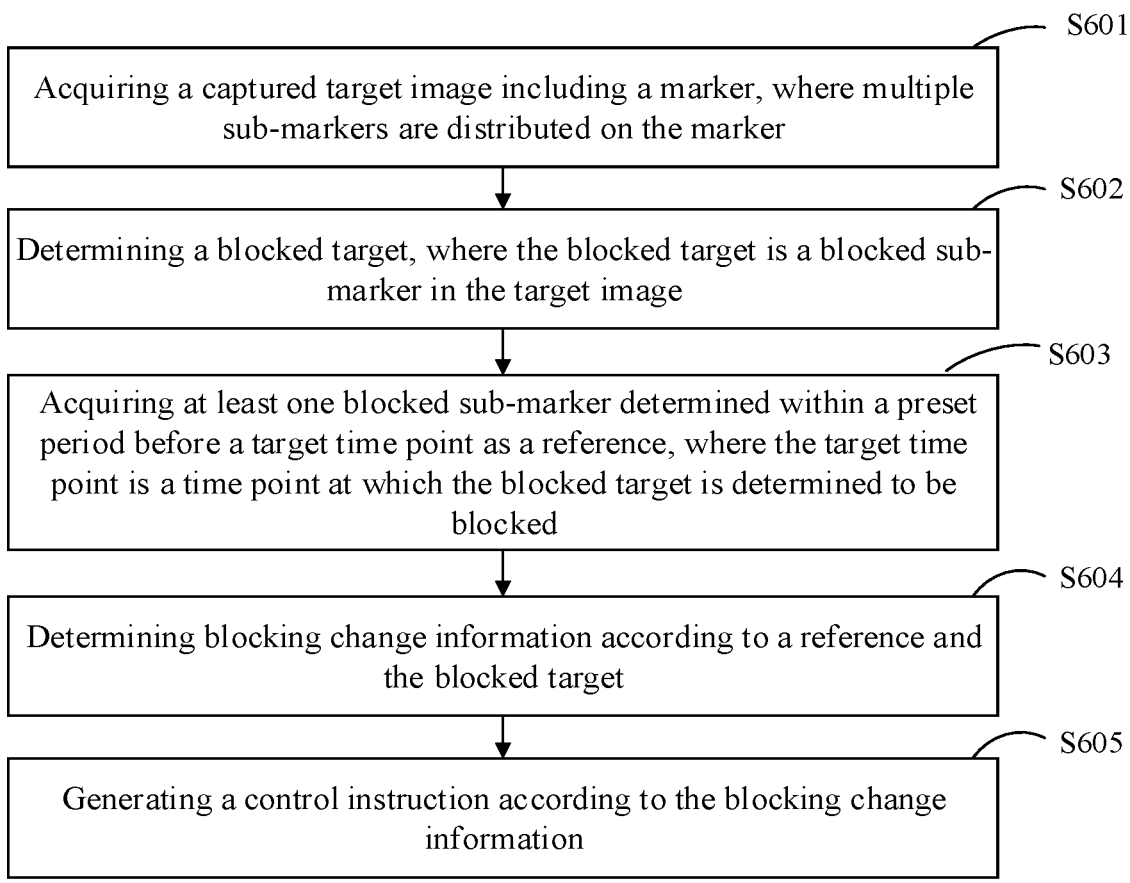
FIG. 6 is a flowchart of a method of controlling virtual content according to another embodiment of the present disclosure.

In some embodiments, the terminal device can detect the sub-marker that is blocked for a period of time, acquire a variation regularity of the blocked sub-marker to determine a moving path of a shield for blocking the sub-marker, and generate a control instruction corresponding to the moving path. Referring to FIG. 6, an embodiment of the present disclosure provides a corresponding method of controlling virtual content, and the method includes blocks S601 to S605.

Block S601: acquiring a captured target image including a marker, where multiple sub-markers are distributed on the marker.

Block S602: determining a blocked target, where the blocked target is a blocked sub-marker in the target image.

Block S603: acquiring at least one blocked sub-marker determined within a preset period before a target time point as a reference, where the target time point is a time point at which the blocked target is determined to be blocked.

The terminal device stores, at every time, a time point at which it is detected that the sub-marker is blocked and the blocked sub-marker in a blocking record. The blocking record is exemplarily shown in Table 3.

TABLE 3

| Number | Blocked Target | Blocked Time Point |
|---|---|---|
| 1 | First Sub-marker | August 3, 12:00:03 |
| 2 | Third Sub-marker | August 3, 12:00:05 |
| 3 | Fourth Sub-marker | August 3, 12:00:10 |
| 4 | First Sub-marker | August 3, 12:00:14 |

By looking up the blocking record, all blocked sub-markers and the blocked time points within a certain period can be determined. In one implementation, in order to avoid redundancy of data, data in the blocking record can be emptied at regular intervals, for example, every two hours or one day. The blocking record may also be emptied when the terminal device is turned off, or when the terminal device is in unused state within a period longer than one preset idle period. The unused state is a state in which the camera of the terminal device is turned off or in a state of running in a background.

In some embodiments, the preset period can be a period within a preset duration before the target time point, and it can be set according to user's needs or user's usage behaviors. In an implementation, a usage duration, in which the terminal device is in using state, is acquired at every time, and the usage duration is a duration from being turned on to being turned off or a duration from being turned on to being in the unused state. An average usage duration is acquired according to the usage durations of multiple times, and the preset duration is determined according to the average usage duration, so as to set the preset period. For example, in one hour, the number of usage times is 7 in total, and corresponding usage durations are 10 seconds, 20 seconds, 13 seconds, 18 seconds, 28 seconds, 40 seconds, and 5 seconds, respectively. Therefore, an average value calculated is 19.14 seconds, and the preset duration can be set to 19.14 seconds or 19.14/L seconds, where L is greater than 1. For example, 19.14/2=9.57 seconds, to ensure that the preset duration is relatively moderate.

The terminal device searches for, according to the determined target time point, the blocked sub-markers in the blocking record within a preset period before the target time point, takes the blocked sub-markers found as alternatives, and selects at least one blocked sub-marker from the alternatives as the reference.

The reference can be all or a part of the blocked sub-markers included in the alternatives. In an implementation, at least one blocked sub-marker adjacent to the blocked target, which is determined at the target rime point, can be selected as the reference. For example, the target time point is 12:00:20 on August 3, and the preset duration is 19 seconds. The preset period before the target time point is 12:00:00 to 12:00:19, and exemplarily, the blocking record is as shown in Table 3. The determined alternatives include the first sub-marker, the third sub-marker, the fourth sub-marker, and the first sub-marker. All sub-markers included in the alternatives are arranged in a chronological order of the blocked time points to form an alternative sequence, i.e., [first sub-marker, third sub-marker, fourth sub-marker, first sub-marker]. If the number of the references is 3, the third sub-marker, the fourth sub-marker and the first sub-marker are selected from the alternative sequence as the references. If the number of the references is 2, the fourth sub-marker and the first sub-marker are selected from the alternative sequence as the references.

The reference is configured to determine a change of the blocked sub-markers within the preset period, and the determination of the number of the references can be set according to users' needs. In an implementation, the number of the reference can be one, and a last blocked sub-marker before the target time point is acquired as the reference. For example, in Table 3, the first sub-marker is taken as the reference.

Block S604: determining blocking change information according to the reference and the blocked target.

The blocking change information includes at least one of target change information and a change duration. The target change information is determined according to an identification of the reference and an identification of the blocked target, and the change duration is a duration between the time point at which the reference is determined to be blocked and the target time point.

The target change information indicates a change in the identification of each blocked sub-marker between the reference and the blocked target. For example, if the reference includes a first sub-marker and the blocked target is the fourth sub-marker, the target change information is the first sub-marker to the fourth sub-marker.

The number of the references can be two or more, for example, the blocked target is the fourth sub-marker, and the references include the third sub-marker, the fourth sub-marker and the first sub-marker. The blocked time points of the third sub-marker, the fourth sub-marker and the first sub-marker are arranged chronologically. The target change information is the third sub-marker, the fourth sub-marker, the first sub-marker to the fourth sub-marker, indicating that a variation trend of the blocked sub-marker is from the third sub-marker to the fourth sub-marker, and then to the first sub-marker, and finally to the fourth sub-marker.

The change duration represents a duration between the blocked time point at which the reference is blocked and the target time point at which the blocked target is blocked. When the number of the references is two or more, the change duration may be a duration between the earliest blocked time point at which the reference is blocked and the target time point can be acquired as the change duration.

Block S605: generating a control instruction according to the blocking change information.

In an embodiment, a correspondence between the target change information and the control instruction is pre-stored in the terminal device. For example, the correspondence between the target change information and the control instruction is as shown in Table 4.

TABLE 4

| Virtual Object 1 | |
| --- | --- |
| Target Change Information | Control Instruction |
| First Sub-marker to Second Sub-marker | Enlargement |
| Second Sub-marker to First Sub-marker | Reduction |
| First Sub-marker to Fourth Sub-marker | Clockwise Rotation |
| Fourth Sub-marker to First Sub-marker | Counterclockwise Rotation |

According to the correspondence between the target change information and the control instruction, a control instruction corresponding to the target change information can be acquired.

In some embodiments, the control instructions corresponding to two reverse target change information can be used to control the virtual object to realize two reverse effects. For example, the target change information is the first sub-marker to the second sub-marker, and a corresponding control instruction can be to enlarge the virtual object from a first size to a second size; the target change information is from the second sub-marker to the first sub-marker, and the corresponding control instruction can be to reduce the virtual object from the second size to the first size. The size of the virtual object can be enlarged or reduced by moving the shield between the first sub-marker and the second sub-marker.

In some embodiments, the control instruction can be generated according to the change duration, a correspondence between the change duration and the control instruction is pre-stored in the terminal device, and a control instruction corresponding to the change duration can be acquired according to the correspondence.

In some embodiments, the terminal device can generate a control instruction according to the change duration and the target change information. For example, the correspondence between the control instruction and, the target change information and the change duration can be referred to Table 5.

TABLE 5

| Virtual Object 1 | |
| --- | --- |
| Blocked Target | Control Instruction |
| First Sub-marker to Second Sub-marker | Enlargement |
| Time Range 1 | 1 Time |
| Time Range 2 | 2 Times |
| Time Range 3 | 3 Times |
| First Sub-marker to Fourth Sub-marker | Rotation |
| Time Range 1 | 60° |
| Time Range 2 | 120° |
| Time Range 3 | 180° |

For example, the time range 2 is [10 S, 20 S]. If a change duration is 13 S, the change duration falls within the time range 2, and corresponds to a control instruction of enlarging by 2 times.

For example, the target change information is the first sub-marker to the second sub-marker, and the change duration is 6 seconds. After acquiring the target change information, the control instruction corresponding to the target change information is determined to enlarge, that is, the size of the virtual object can be enlarged. And then, determining the time range to which the change duration belongs, it is assumed that the time range 1 is [4 S, 9 S], the time range 2 is [10 S, 20 S], and the time range 3 is [21 S, 30 S], so the change duration above-described is within the time range 1 and the corresponding control instruction is to enlarge by 1 time. Thus, a size of the virtual object observed by the user is enlarged by 1 time compared with the one before changing.

The part that is not described in detail in the method embodiment above, for example, the blocking change information can be change information of different feature points, can be referred to the foregoing embodiment.

In some embodiments, in order to avoid an occurrence of false blocking, for example, the user's hand temporarily blocks a sub-marker when passing the sub-marker, and in order to prevent excessive power consumption caused by the terminal device continuously analyzing whether the sub-marker in the captured target image is blocked, a start-up instruction can be set. The operation of determining the blocked sub-marker in the target image as the blocked target can be executed upon the start-up instruction is acquired.

In some embodiments, a start-up button can be provided. The start-up button can be a physical button on the terminal device or a virtual button displaying on the terminal device. For example, the terminal device displays the virtual button, and the user executes a click operation on the virtual button by using a controller or the like.

In an implementation, when the user uses a shield to block any one of the sub-markers included in the marker for one period, it can be determined that the start-up instruction is acquired. For example, the terminal device can detect the blocked sub-marker in the target image and obtain a blocking duration in which the sub-marker is blocked. When the blocking duration is greater than a preset value, it is determined that the start-up instruction is acquired.

When the sub-marker is blocked, multiple frames of images can be continuously captured, and the time, during which the blocked sub-marker is continuously blocked, is counted. The continuous blocked time is recorded as the blocking duration, and whether the blocking duration is greater than the preset value is determined. When the blocking duration is greater than the preset value, it is determined that the start-up instruction is detected. The preset value is a value set according to actual demands.

In an implementation, a start-up marker corresponding to the start-up instruction can be provided, and the start-up marker can be a pattern. The terminal device determines whether an image of the start-up marker is captured, and when it is confirmed that the image of the start-up marker is captured, the start-up instruction is acquired. The image of the start-up marker is pre-stored in the terminal device. The terminal device can compare the captured image with the pre-stored image of the start-up marker, and if the captured image matches the pre-stored image of the start-up marker, the start-up instruction is acquired. Therefore, when controlling the virtual object by blocking the sub-marker, the start-up instruction can be obtained simply by placing the start-up marker within a visual range of the camera.

In an implementation, when the image of the start-up marker is captured, a continuous duration for continuously capturing the image of the start-up marker can be acquired. The start-up instruction is generated when the continuous duration is greater than the preset start-up time.

In the a method of controlling virtual content in the above embodiment, a control instruction for controlling the display of the virtual object is generated according to the blocked sub-marker, and the user controls the display of the virtual object by blocking the sub-marker in the marker within the visual range of the camera, which improves the interaction between the user and the virtual object.

Figure 7:
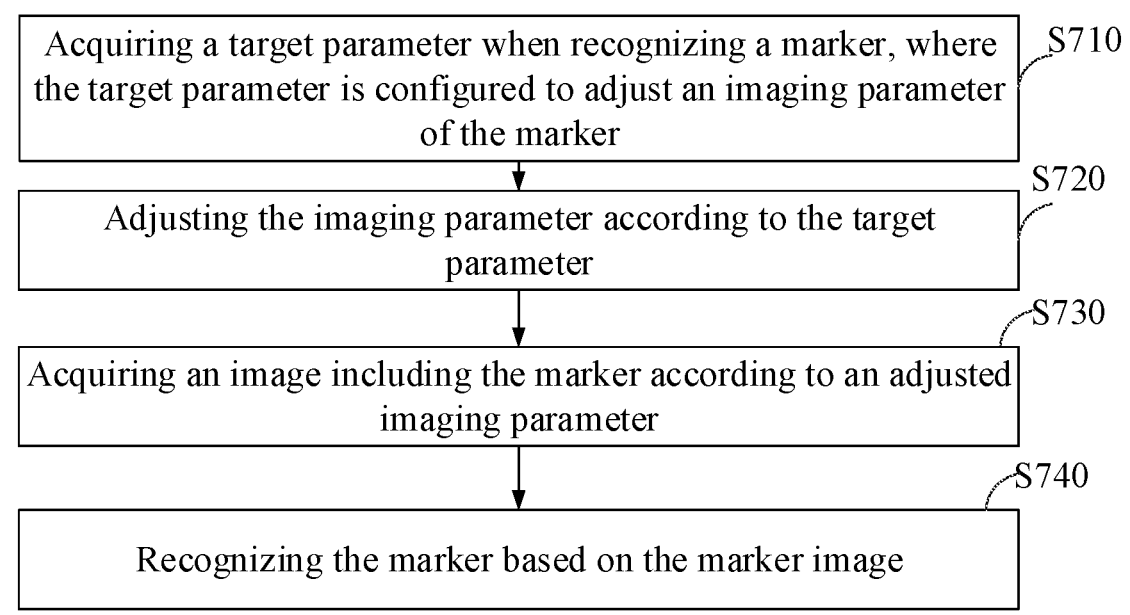
FIG. 7 is a flowchart of a marker recognition method according to an embodiment of the present disclosure.

Referring to FIG. 7, a marker recognition method provided by an embodiment of the present disclosure is applied to a terminal device, and the method includes following blocks.

Block S710: acquiring a target parameter when recognizing a marker, where the target parameter is configured to adjust an imaging parameter of the marker.

Figure 8:
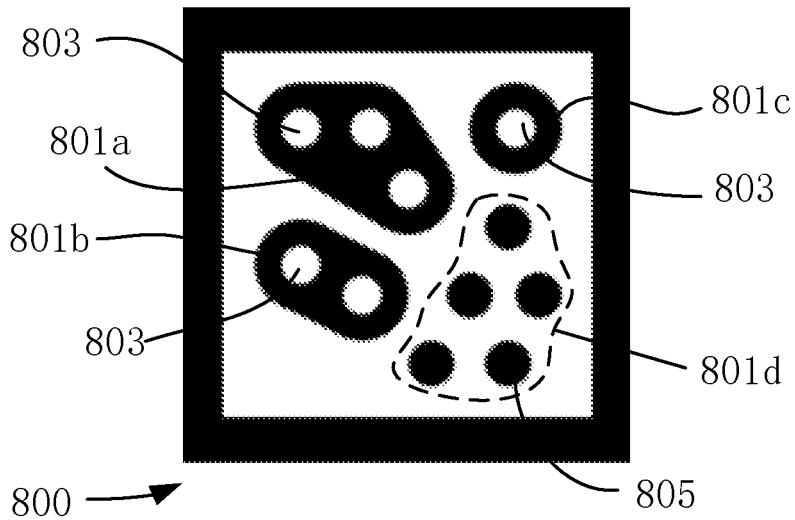
FIG. 8 is a schematic diagram of a marker provided by another embodiment of the present disclosure.

Captured images will be affected by imaging conditions when the terminal device captures and images the marker by a camera, such that it is difficult to distinguish feature points in the captured image including the marker and causes inaccurate recognition of the marker. For example, a marker 800 shown in FIG. 8 includes sub-markers 801*a*, 801*b*, 801*c* and 801*d*, at least one white circular feature point 803 are provided in each of the sub-markers 801*a*, 801*b*, and 801*c*. The sub-marker 801*d* is composed of multiple separated black circular feature points 805. When the imaging conditions are not good, it is easy to cause adjacent white circular feature points 803 to communicate with each other to form one feature point in the image. Therefore, the imaging parameter of the marker can be adjusted, to make it easier to distinguish the feature points in the image including the marker and captured by the terminal device.

The imaging parameter will affect a differentiation of the feature points in the captured image including the marker. The imaging parameter can be illumination brightness of a light source of the terminal device or an illumination brightness of the marker. The illumination brightness of the light source of the terminal device may be provided by a light source disposed on the terminal device, and it is configured to provide an imaging environment when the terminal device captures image with the marker. In some embodiments, the marker is a pattern that can be recognized, the illumination brightness of the marker may be provided by a light source disposed on a carrier on which the marker is mounted. The marker can also be an actively light-emitting object with light-spot. The light spot can emit lights of different wavelength bands or different colors. The terminal device acquires an identification corresponding to the light spot by identifying information such as a band or color of light emitted by the light spot. The illumination brightness of the marker may be provided by the light spot. The illumination brightness of the marker is configured to provide an imaging environment when the terminal device captures image with the marker. The specific imaging parameter is not limited, for example, parameters may be a size of an aperture, an exposure time of a camera, and the like.

In some embodiments, the imaging parameter for imaging the marker can be adjusted according to the target parameters for recognizing the marker. The target parameter can be a parameter related to the imaging parameter, such as a distance from the marker to the terminal device, image features in a captured image of the marker corresponding to a current imaging parameter, and the like. The specific target parameter is not limited, and can be, for example, a brightness of an ambient light or the like.

In an implementation, the terminal device can acquire the target parameter by detecting the distance from the marker to the terminal device via a sensor, or obtaining the image feature by recognizing the image including the marker, which is not limited herein. A corresponding acquisition method can be adopted according to a content of a specific target parameter.

Block S720: adjusting the imaging parameter according to the target parameter.

The imaging parameter can be adjusted according to the captured target parameter, that is, to adjust the illumination brightness of the light source of the terminal device or the illumination brightness of the marker.

In some embodiments, an adjustment can be performed according to a correspondence between the imaging parameter and the target parameter, and the imaging parameter can also be increased or decreased to a target value according to a relationship between the imaging parameter and a preset threshold. For example, the imaging parameter is the illumination brightness of the light source of the terminal device or the illumination brightness of the marker, and the target parameter is the distance from the marker to the terminal device. The illumination brightness of the light source of the terminal device or the illumination brightness of the marker is directly proportional to the distance from the marker to the terminal device, and the illumination brightness of the light source of the terminal device or the illumination brightness of the marker can be adjusted according to a directly proportional relationship.

Whether a brightness of the captured image is normal can be judged according to the target parameter. Therefore, when the brightness of the captured image is slightly high, the illumination brightness of the light source of the terminal device or the illumination brightness of the marker can be lowered in order to reduce the brightness of the captured image to a normal range. When the brightness of the captured image is slightly low, the illumination brightness of the light source of the terminal device or the illumination brightness of the marker can be increased in order to increase the brightness of the captured image including the marker to the normal range, and thus to make the brightness of images including the marker subsequently captured be normal, thereby making it convenient to distinguish the feature points of the marker included in the image and improving an recognition accuracy of images of the marker.

Block S730: acquiring the image including the marker according to the adjusted imaging parameter.

According to the adjusted imaging parameter, the terminal device can perform image acquisition on the marker and obtain an image including the marker.

Block S740: recognizing the marker based on the image including the marker.

The captured image including the marker is recognized to obtain a position and pose of the marker relative to the terminal device, and the identification of the marker. The pose includes an orientation and a rotation angle of the marker relative to the terminal device.

With the marker recognition method provided by embodiments of the present disclosure, the brightness of the captured image including the marker according to an adjusted imaging parameter is normal, such that it is easy to distinguish the feature points in the image including the marker and an accuracy of the recognition result is improved.

Figure 9:
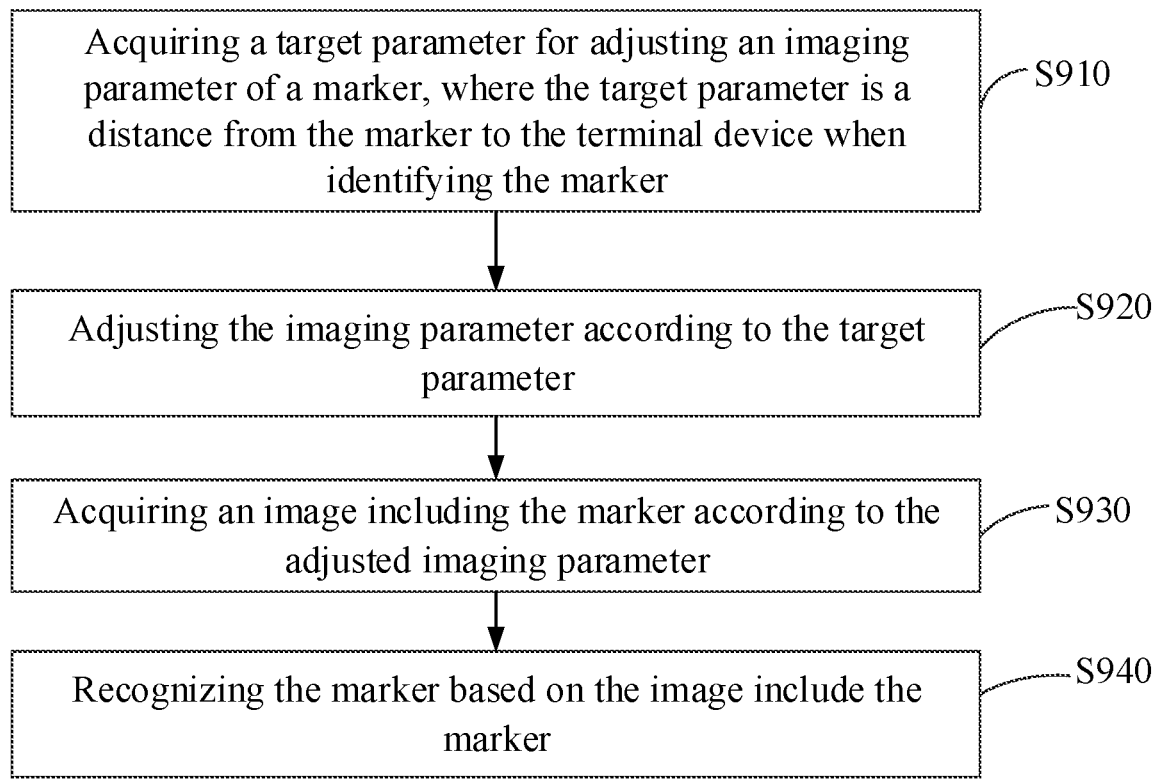
FIG. 9 is a flowchart diagram of a marker recognition method according to another embodiment of the present disclosure.

Referring to FIG. 9, another embodiment of the present disclosure provides a marker recognition method which is performed by a terminal device, and the method includes following blocks.

Block S910: acquiring a target parameter for adjusting an imaging parameter of a marker, where the target parameter is a distance from the marker to the terminal device when identifying the marker.

In some embodiments, the terminal device can recognize the marker using a current imaging parameter, that is, under a current illumination brightness of the light source of the terminal device or the illumination brightness of the marker, an image acquisition on the marker is performed by the camera to obtain a first image including the marker. The first image is recognized to obtain a spatial position of the marker relative to the terminal device, and the distance from the marker to the terminal device is obtained based on the spatial position.

In some embodiments, the distance from the marker to the terminal device can be detected through a sensor of the terminal device. For example, the distance can be detected through a distance sensor, an ultrasonic sensor, or the like.

Block S920: adjusting the imaging parameter according to the target parameter.

The current imaging parameter can be adjusted according to the distance from the marker to the terminal device.

In an embodiment, the imaging parameter includes an illumination brightness of the light source of the terminal device, and the illumination brightness of the light source of the terminal device can be adjusted according to the distance from the marker to the terminal device. When the distances from the marker to the terminal device are different, the marker can be imaged using different illumination brightness of the light source, to make a brightness of the imaged image including the marker normal. Target brightness corresponding to the distance can be found according to the distance from the marker to the terminal device. The light source of the terminal device can be a visible light source, an infrared invisible light source, or the like. An infrared image including the marker is captured through an infrared camera of the terminal device, and a brightness of the infrared light source can be adjusted.

In an implementation, the terminal device may pre-store a correspondence between the distance from the marker to the terminal device and the illumination brightness of the light source. After acquiring the distance from the marker to the terminal device, the corresponding target brightness can be found according to the correspondence. The correspondence can be a proportional relationship between the target brightness and the distance. That is, the greater the distance from the marker to the terminal device, the higher the target brightness.

In one embodiment, the distance from the marker to the terminal device can also be compared to a preset distance. If the distance from the marker to the terminal device is greater than a first preset distance, the illumination brightness of the light source is increased to first target brightness. If the distance from the marker to the terminal device is less than a second preset distance, the illumination brightness of the light source of the terminal device is reduced to second target brightness. If the distance from the marker to the terminal device is between the first preset distance and the second preset distance, the illumination brightness of the light source is not adjusted.

In an implementation, the imaging parameter includes illumination brightness of the marker. The carrier on which the marker is mounted includes an actively light-emitting object composed of light-spot, and a light-emitting brightness of the actively light-emitting object is take as the illumination brightness of the marker. The illumination brightness of the marker may be adjusted according to the distance from the marker to the terminal device. When the distances of the marker relative the terminal device are different, the illumination brightness of the marker can be controlled to be different, such that the brightness of the imaged image including the marker can be normal.

In an embodiment, the terminal device may pre-store a correspondence between the distance from the marker to the terminal device and the illumination brightness of the marker. After acquiring the distance from the marker to the terminal device, the corresponding target light-emitting brightness can be found according to the correspondence. The correspondence can be a proportional relationship between the illumination brightness of the marker and the distance. That is, the greater the distance from the marker to the terminal device, the higher the illumination brightness of the marker.

In an embodiment, the distance from the marker to the terminal device can be compared to a preset distance. If the distance from the marker to the terminal device is greater than a first preset distance, the illumination brightness of the marker is increased to first light-emitting target brightness. If the distance from the marker to the terminal device is less than a second preset distance, the illumination brightness of the marker is reduced to second light-emitting target brightness. If the distance from the marker to the terminal device is between the first preset distance and the second preset distance, the illumination brightness of the marker is not adjusted. The terminal device may connected to the carrier, after acquiring an instruction of adjusting to a target illumination brightness of the marker, a first control instruction corresponding to the target illumination brightness of the marker is generated, and the first control instruction is sent to the carrier. After receiving the first control instruction, the carrier may adjust the light-emitting brightness of the actively light-emitting object to the target light-emitting brightness in response to the first control instruction.

Block S930: acquiring the image including the marker according to the adjusted imaging parameter.

After adjusting the illumination brightness of the light source or the illumination brightness of the marker according to the distance from the marker to the terminal device, an image including the marker is captured, and brightness of the image is in a normal range.

Block S940: recognizing the marker based on the image including the marker.

In some embodiments, the imaging parameter such as the exposure time or the size of the aperture can be adjusted according to the distance from the marker to the terminal device. For example, the exposure time of the camera is adjusted according to a relationship in which the greater the distance from the marker to the terminal device, the longer the exposure time of the camera. For another example, the size of the aperture of the camera is adjusted according to a relationship in which the greater the distance from the marker to the terminal device, the greater the size of the aperture of the camera.

The marker recognition method provided by the embodiments of the present disclosure can adjust the illumination brightness of the light source or the illumination brightness of the marker according to the distance from the marker to the terminal device, so as to make the brightness of the captured marker image be normal and improve an efficiency and accuracy of the marker recognition.

Figure 10:
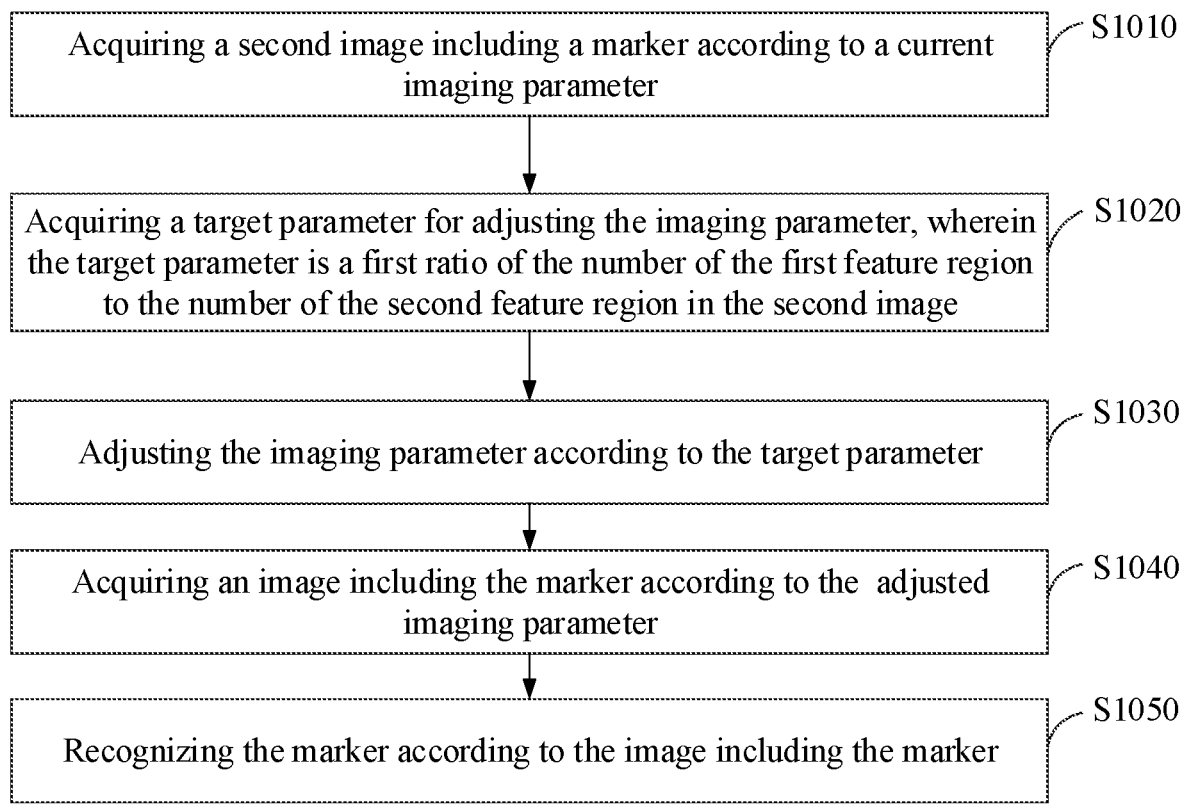
FIG. 10 is a flowchart diagram of a marker recognition method according to another embodiment of the present disclosure.

Referring to FIG. 10, another embodiment of the present disclosure provides a marker recognition method, which is performed a terminal device, and the method includes following blocks.

Block S1010: acquiring a second image including a marker according to a current imaging parameter.

In one embodiment, the marker includes at least one first feature region and a second feature region. Specifically, the marker includes several sub-markers, each sub-marker has one or more feature points, and color of the different feature points can be different. For example, the color of the feature points includes white and black. The first feature region is a black feature point in the marker (such as the feature point 805 in FIG. 8), and the second feature region is a white feature point in the marker (such as the feature point 803 in FIG. 8). In some embodiments, in the marker, the size of each white feature point and black feature point can be the same, a ratio of the number of the white feature point to the number of the black feature point can be a constant ratio.

Since the imaging parameter is different, the brightness of the captured image including the marker may be different, the ratio of the number of the first feature region to the number of the second feature region can be different. For example, the first feature region is a black feature point, and the second feature region is a white feature point. When the brightness of the image including the marker exceeds a normal value, the number of black feature points which are identifiable may be smaller, and the ratio of the number of the first feature region to the number of the second feature region is smaller than the constant ratio. When the brightness of the image including the marker is lower than the normal value, the number of white feature points that are identifiable may be smaller, and the ratio of the number of the first feature region to the number of the second feature region is greater than the constant ratio.

Block S1020: acquiring a target parameter for adjusting the imaging parameter, wherein the target parameter is a first ratio of the number of the first feature region to the number of the second feature region in the second image.

The terminal device captures the second image including the marker according to the current imaging parameter by the camera, and recognizes the first ratio of the number of the first feature region to the number of the second feature region in the second image.

Block S1030: adjusting the imaging parameter according to the target parameter.

In some embodiments, when the first ratio is greater than a ratio threshold, a brightness of the light source of the terminal device can be increased to a third target brightness. When the first ratio is smaller than the ratio threshold, the brightness of the light source of the terminal device can be lowered to a fourth target brightness. Magnitudes of the third target brightness and the fourth target brightness can be selected according to an actual first ratio. For example, the greater the first ratio relative to the ratio threshold, the greater the third target brightness; the smaller the first ratio relative to the ratio threshold, the smaller the fourth target brightness.

In some embodiments, when the first ratio is greater than the ratio threshold, a second control instruction is sent to the carrier, and the second control signal is configured to indicate that the marker increases its light-emitting brightness to a third target light-emitting brightness. When the first ratio is smaller than the ratio threshold, a third control signal is sent to the marker, and the third control signal is configured to indicate that the marker reduces its light-emitting brightness to a fourth target light-emitting brightness. Magnitudes of the third target light-emitting brightness and the fourth target light-emitting brightness can be selected according to the actual first ratio. For example, the greater the first ratio relative to the ratio threshold, the greater the third target light-emitting brightness; the smaller the first ratio relative to the ratio threshold, the smaller the fourth target light-emitting brightness.

Block S1040: acquiring an image including the marker according to the adjusted imaging parameter.

Block S1050: recognizing the marker according to the image including the marker.

In some embodiments, the imaging parameter such as the exposure time or the size of the aperture can also be adjusted according to the first ratio of the number of the first feature region to the number of the second feature region. For example, when the first ratio is greater than the ratio threshold, the exposure time of the camera is increased; otherwise, the exposure time is decreased. For another example, when the first ratio is greater than the ratio threshold, the aperture of the camera is increased; otherwise, the aperture is decreased.

In some embodiments, a second ratio of an area of the first feature region to an area of the second feature region can also be taken as a target parameter for adjusting the brightness of the light source of the terminal device or the brightness of the marker.

In some embodiments, the target parameter includes average brightness of a region of a first color in the captured image. The terminal device can acquire an image including the marker according to the current imaging parameter, process the image to obtain the average brightness of the region of the first color, and adjust the imaging parameter according to the average brightness. In an example embodiment, when the average brightness is greater than a brightness threshold, the brightness of the light source of the terminal device or the brightness of the marker is reduced; when the average brightness is smaller than the brightness threshold, the brightness of the light source of the terminal device or the brightness of the marker is increased.

In some embodiments, the imaging parameter such as the exposure time or the size of the aperture can be adjusted according to the average brightness of the region of the first color.

In some embodiments, the target parameter includes a ratio of an area of the first color region of the marker in the captured image to an area of a second color region of the marker in the captured image. The terminal device acquires the captured image including the marker according to the current imaging parameter, acquires a size of the area of the first color region and a size of the area of the second color region of the marker in the image to obtain an area ratio between the two, and adjusts the imaging parameter according to the area ratio. In an example embodiment, the first color region is a black region, and the second color region is a white region. When the area ratio of the first color region to the second color region is greater than a standard ratio, the brightness of the light source of the terminal device or the illumination brightness of the marker is increased; and when the area ratio of the first color region to the second color region is smaller than the standard ratio, the brightness of the light source of the terminal device or the illumination brightness of the marker can be reduced.

The marker recognition method provided by the above embodiments adjusts, according to the first ratio of the number of first feature region to the number of second feature region in the captured image or the average brightness of the first color region and so on, the brightness of the light source of the terminal device or the illumination brightness of the marker, in order to make the brightness of the captured image including the marker be normal, which causes the feature points in the image including the marker to be easily distinguished, and causes the efficiency and accuracy of the recognition to be improved.

An embodiment of the present disclosure also provides a computer readable storage medium storing a program code. The program code can be executed by a processor to perform the method described in the method embodiments above.

The above embodiments merely describe technical solutions of the present disclosure and are not intended to limit the present disclosure in any way. Although the present disclosure has described above in detail in the embodiments above, various modifications and equivalent alternatives can be made by those skilled in the art. These modifications and equivalent alternatives without departing from the substance of technical solutions are to be encompassed by the spirit and the scope of the present disclosure.

What is claimed is:

1. A terminal device, comprising:
   a display configured to display a virtual object;
   a camera configured to capture a target image including a marker;
   at least one processor; and
   a memory storing one or more programs configured to be executed by the at least one processor, the one or more programs including instructions of:
   acquiring the target image including the marker, wherein a plurality of sub-markers are distributed on the marker, features of the plurality of sub-makers are different, each of the plurality of sub-markers comprises at least one feature point, the feature comprises information of the at least one feature point of the sub-marker;
   determining a blocked target according to a blocked feature, wherein the blocked target is a blocked sub-marker of the plurality of sub-markers in the target image;
   acquiring, as a reference, at least one blocked sub-marker determined within a preset period before a target time point, wherein the target time point is a time point at which the blocked target is determined to be blocked,
   determining blocking change information according to the reference and the blocked target, the blocking change information comprises target change information indicating a change trend from the reference to the blocked target,
   generating a control instruction for the virtual object according to the blocking change information;
   generating a sub-control instruction for the virtual object according to blocked information of the blocked target; and
   controlling the displayed virtual object based on the control instruction and the sub-control instruction.

2. The terminal device of claim 1, wherein the determining the blocked target comprises:
   determining the blocked sub-marker in the target image; and
   determining, as the blocked target, a blocked feature point from the at least one feature point in the blocked sub-marker, wherein the blocked information is obtained based on pixel points of a blocked portion of the blocked feature point.

3. The terminal device of claim 2, wherein the sub-control instruction corresponding to the blocked feature point and the control instruction corresponding to the blocked sub-marker is a same type of control instructions.

4. The terminal device of claim 3, wherein the control instruction is configured to enlarge the virtual object, and the sub-control instruction is configured to enlarge the virtual object with a preset multiple.

5. The terminal device of claim 2, wherein the sub-control instruction corresponding to the blocked feature point and the control instruction corresponding to the blocked sub-marker are different types of control instructions.

6. The terminal device of claim 5, wherein the control instruction is configured to enlarge the virtual object, and the sub-control instruction is configured to rotate the virtual object by preset degrees.

7. The terminal device of claim 2, wherein the marker is a pattern comprises a topology structure, referring to a communication relationship between the sub-markers and the at least one feature point of the marker.

8. The terminal device of claim 1, wherein the blocked information comprises a ratio of a number of pixel points occupied by a blocked portion of the blocked target in the target image to a number of pixel points occupied by an unblocked portion of the blocked target in the target image.

9. The terminal device of claim 1, wherein the generating the control instruction for the virtual object comprises:
acquiring a position of the blocked target on the marker;
determining a virtual button that matches the position; and
generating the control instruction for pressing the virtual button.

10. The terminal device of claim 1, wherein the determining the blocked target comprises:
receiving a start-up instruction in response to capturing an image of a start-up marker; and
determining the blocked target in response to the start-up instruction.

11. The terminal device of claim 1, wherein the determining the blocked target comprises:
detecting one blocked sub-marker in the target image;
acquiring a blocking duration in which the one blocked sub-marker is blocked;
generating a start-up instruction when the blocking duration is greater than a preset value; and
determining the blocked target in response to the start-up instruction.

12. The terminal device of claim 1, wherein the control instruction is configured to enlarge or reduce the virtual object, and the sub-control instruction is configured to enlarge or reduce the virtual object with a preset multiple.

13. The terminal device of claim 1, wherein the generating a sub-control instruction according to blocked information of the blocked target comprises:
determining a change duration indicating a duration between a time point at which the reference is determined to be blocked and the target time point, and
generating the sub-control instruction according to the change duration;
and wherein the controlling the displayed virtual object based on the control instruction and the sub-control instruction comprises:
controlling the displayed virtual object based on the blocking change information and the change duration.

14. The terminal device of claim 1, wherein an imaging parameter of the marker is adjusted, before the acquiring of the target image including the marker.

15. A method of controlling virtual content, comprising:
acquiring a target image including a marker, wherein a plurality of sub-markers are distributed on the marker, features of the plurality of sub-markers are different, and there is a preset correspondence between the features and identifications of the sub-markers, each of the plurality of sub-markers comprises at least one feature point, the feature comprises information of the at least one feature point of the sub-marker;
determining a blocked target, wherein the blocked target is a blocked sub-marker of the plurality of sub-markers in the target image;
acquiring, as a reference, at least one blocked sub-marker determined within a preset period before a target time point, wherein the target time point is a time point at which the blocked target is determined to be blocked,
determining blocking change information according to the reference and the blocked target, the blocking change information comprises target change information indicating a change trend from the reference to the blocked target,
generating a control instruction for the virtual object according to the blocking change information;
determining a change duration indicating a duration between a time point at which the reference is determined to be blocked and the target time point,
generating a sub-control instruction for the virtual object according to the change duration; and
controlling a displayed virtual object based on the control instruction and the sub-control instruction.

16. The method of claim 15, wherein the determining the blocked target comprises:
determining the blocked sub-marker in the target image; and
determining, as the blocked target, a blocked feature point from the at least one feature point in the blocked sub-marker, wherein the blocked information is obtained based on pixel points of a blocked portion of the blocked feature point.

17. The method of claim 15, wherein the blocked information comprises a ratio of a number of pixel points occupied by a blocked portion of the blocked target in the target image to a number of pixel points occupied by an unblocked portion of the blocked target in the target image.

18. The method of claim 15, wherein the generating the control instruction for the virtual object comprises:
acquiring a position of the blocked target on the marker;
determining a virtual button that matches the position; and
generating the control instruction for pressing the virtual button.

19. The method of claim 15, wherein the determining the blocked target comprises:
receiving a start-up instruction in response to capturing an image of a start-up marker; and
determining the blocked target in response to the start-up instruction.

20. A non-transitory computer readable medium storing one or more programs configured to be executed by one or more processors of a terminal device, the one or more programs comprising instructions for:
adjusting an imaging parameter of the marker;
acquiring a target image including a marker according to the adjusted imaging parameter, wherein a plurality of sub-markers are distributed on the marker, features of the plurality of sub-markers are different, each of the plurality of sub-markers comprises at least one feature point, the feature comprises information of the at least one feature point of the sub-marker;
determining a blocked target, wherein the blocked target is a blocked sub-marker of the plurality of sub-markers in the target image;

acquiring, as a reference, at least one blocked sub-marker determined within a preset period before a target time point, wherein the target time point is a time point at which the blocked target is determined to be blocked, determining blocking change information according to the reference and the blocked target, the blocking change information comprises target change information indicating a change trend from the reference to the blocked target, generating a control instruction for the virtual object according to the blocking change information;

generating a sub-control instruction for the virtual object according to blocked information of the blocked target; and controlling the displayed virtual object based on the control instruction and the sub-control instruction.

* * * * *